(No Model.) 2 Sheets—Sheet 1.

H. C. PRATT.
HARROW.

No. 386,847. Patented July 31, 1888.

Witnesses
H G Phillips.
John F. Skinner.

Inventor
Henry C. Pratt
By his Attorney
Geo. B. Selden.

(No Model.) 2 Sheets—Sheet 2.

H. C. PRATT.
HARROW.

No. 386,847. Patented July 31, 1888.

Witnesses
H G Phillips
John F. Skinner

Inventor
Henry C. Pratt,
By his Attorney
Geo. B. Selden

UNITED STATES PATENT OFFICE.

HENRY C. PRATT, OF CANANDAIGUA, NEW YORK.

HARROW.

SPECIFICATION forming part of Letters Patent No. 386,847, dated July 31, 1888.

Application filed September 17, 1887. Serial No. 249,920. (No model.)

*To all whom it may concern:*

Be it known that I, HENRY C. PRATT, of Canandaigua, New York, have invented certain new and useful Improvements in Harrows, of which the following is a specification, reference being had to the accompanying drawings.

My invention relates to spring-tooth harrows; and it consists in an improved construction of the frame, in a novel method of securing the teeth thereto, and in a device for adjusting the depth to which the teeth shall enter the ground.

My invention is fully described and illustrated in the following specification and accompanying drawings, the novel features thereof being specified in the claims annexed to the said specification.

My improvements in harrows are illustrated in the accompanying drawings, in which—

Figure 1:
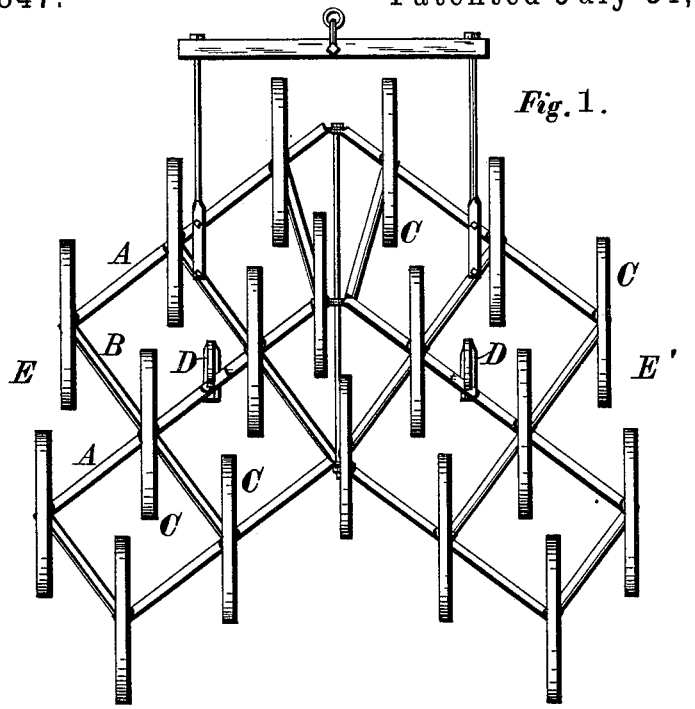
Figure 2:
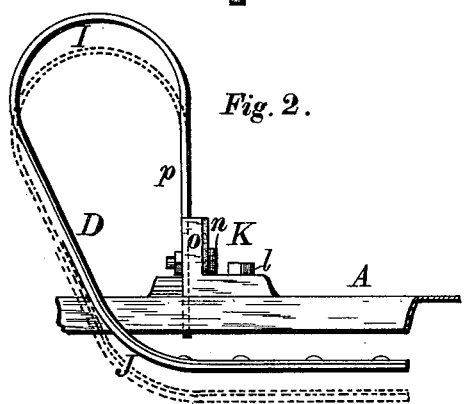
Figure 3:
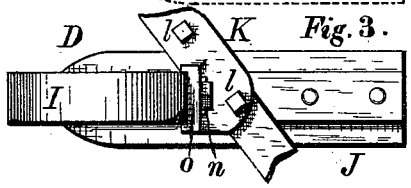
Figure 4:
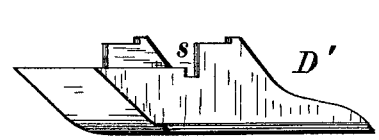
Figure 5:
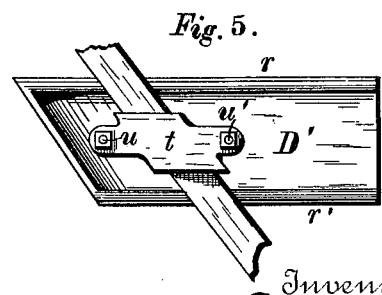
Figure 6:
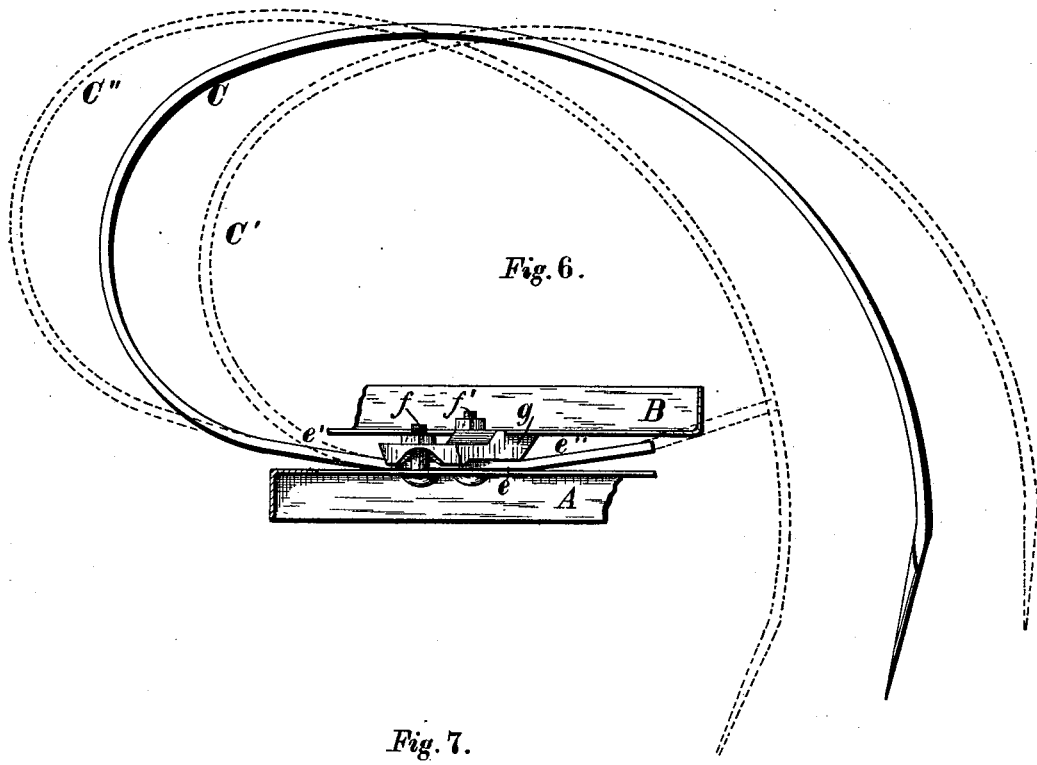
Figure 7:
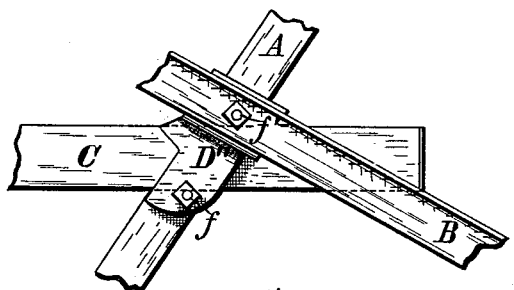
Figure 8:
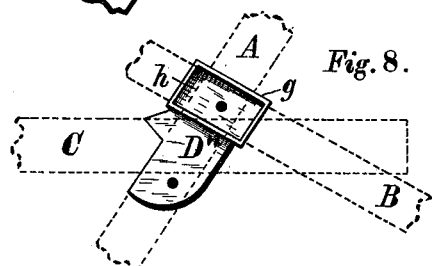

Figure 1 is a plan view of a harrow embodying my improvements. Fig. 2 is an elevation of one of the adjustable shoes. Fig. 3 is a plan of the same. Fig. 4 is a side view of a modified form of shoe. Fig. 5 is a plan view of the same. Fig. 6 is a side view of one of the adjustable spring-teeth. Fig. 7 is a plan view of saddle by which the adjustable spring-tooth is attached to the frame. Fig. 8 represents the saddle detached.

In the accompanying drawings, A A are the draw-bars and B B the cross-bars of a harrow or cultivator frame, which are formed of L-shaped or angle iron, secured together at their points of intersection and having flanges projecting upward from one set of bars (in this case the cross bars) and downward from the other or draw bars, as indicated in the drawings. At the points where the bars cross each other the saddle D'' is placed between them and secured by bolts $ff'$ passing through the saddle and one or both of the bars A and B. (See Figs. 6 and 7.) The saddle D'' has seats formed on its upper and under surfaces for the cross-bar and spring-tooth C, respectively. The tooth C lies in a seat on the under side of the saddle D'', between it and the draw-bar, being firmly clamped in place by the bolts $f f'$, which are arranged one on each side of the tooth. A tooth is placed near each point where the cross-bars lie over the draw-bars, and the angle at which the bars are arranged relatively to the line of draft is preferably such that no two teeth travel in the same line, thus securing a more thorough working of the soil than would otherwise be the case. The saddle D'' is provided with an enlarged or thickened end, $g$, which raises the bar B to a sufficient distance above the bar A to permit the spring-tooth C to pass between them. The amount of elevation will, however, depend upon the length of the saddle. The shank of the tooth is bent, as shown in Fig. 6, so that a change in its position longitudinally will alter the elevation of the point and, consequently, the depth of its penetration into the soil. I secure this result by bending the end of the tooth which is attached to the bar A so that it presents three straight portions, $e$ $e'$ $e''$, arranged at angles with each other, so that by clamping the tooth to the bar on the middle one, $e$, of these straight portions the point enters the ground to a moderate distance, as represented by the full lines in Fig. 6, while to raise the point so that it shall cut a shallow furrow, the forward flat plate, $e'$, is clamped on the bar A, and the tooth occupies the position indicated at C'. To cultivate deeper the straight portion $e''$ forms the bearing surface, the tooth standing at C''. When the depth to which the harrow cultivates is to be changed, I may provide two or more shoes or runners, D D, which rest on the surface of the ground and prevent the harrow from drawing into the earth too deeply where the soil is soft. A bracket, K, is secured to the frame of the harrow, and the straight shank $p$ of the runner is bolted to an upright, $o$, on the bracket. The shank is provided with a series of bolt-holes to enable the runner to be adjusted up and down, and thus to regulate the height of the harrow-frame from the ground and, consequently, the distance which the teeth shall enter the soil. The shoe is preferably made of thin steel, so as to be elastic and give a little as the harrow rides over obstructions, in order to prevent the shoe, as it strikes a stone or other obstacle, from raising the teeth out of the ground. The spring-shoe D is provided on the under side with a wearing-plate, J, riveted or otherwise secured thereto, which can be easily replaced if broken or worn out. The upright $o$ on the bracket K is provided with a seat for the shank $p$ of the spring-shoe, which is secured thereto by means of the bolt $n$.

In Figs. 4 and 5 I have represented a modified form of shoe, which is designed to be secured directly to the frame of the harrow by means of the clip $t$ and bolts $u\ u'$. A shoe or notch, $s$, is formed in each of the side flanges, $r\ r'$, for the flange on the L-shaped draw-bar, to which the shoe is clamped. The clip $t$ allows of the adjustment of the shoe D′ lengthwise of the bar. A recess, $h$, is formed in the upper surface of the saddle D″ as the seat for the cross-bar B, under the nut on the bolt $f'$, which passes through the two bars, so that as the nut is screwed down the bar B will tend to curve slightly into the recess, and thus be more firmly held in place.

My improved frame of angle iron or steel gives great strength and elasticity to the harrow, and all the nuts and bolt heads are protected by the outwardly-turned flanges of the L-shaped bars.

The advantages secured by my invention are increased durability and cheapness of construction and facility of adjustment of the teeth and shoes.

It is obvious that bars differing in form from those shown may be used in connection with the tooth and saddle herein described without departing from the spirit of my invention, and that a harrow may be constructed with a less number of bars than are indicated in the accompanying drawings, in which case the teeth may be secured to the draw-bar by the saddles at such points on it as required to bring the teeth at suitable distances apart.

I claim—

1. The combination, with a cultivator or harrow frame composed of the angularly-arranged angle-iron bars A B, of the adjustable teeth C, secured to the horizontal flanges of one set of the bars by a saddle, D″, interposed between the bars and attached thereto, substantially as and for the purposes set forth.

2. The combination, with the bar A of a harrow-frame having a plane upper surface, of the spring-tooth C, curved upward and backward over the bar, so that its point is located below and in rear thereof, and having the end by which it is attached to the bar bent upward and inward toward the curved portion, forming two or more flat plates, $e\ e'$, adapted to be secured to the upper surface of the bar by being clamped thereto by the saddle D, substantially as described.

3. In a harrow provided with a frame composed of intersecting bars, the combination, with the draw-bar A, cross-bar B, and spring-tooth C, of the saddle D, having a seat on its upper side for retaining the cross-bar and saddle in a fixed relation, and a seat on its lower side for the tooth, by which the tooth is clamped on the draw-bar, and means for securing the parts in place, substantially as and for the purposes set forth.

4. In a harrow provided with a frame composed of intersecting bars, the combination, with the draw-bar A and the cross-bar B, arranged in different planes and connected together by the saddle D, of the curved adjustable spring-tooth C, provided with two or more angularly-disposed flat plates, $e\ e'$, adapted to be secured to the flat surface of one of the bars, substantially as and for the purposes set forth.

5. The combination, with the angularly-arranged L-shaped bars A and B, of the saddle D″, having thickened end $g$, whereby the bars are separated to permit the spring-tooth C to pass between them and the bolts $f\ f'$, substantially as described.

6. The combination, with the angularly-arranged L-shaped bars A and B, of the spring-tooth C, saddle D″, having recess $h$, and bolts $f\ f'$, substantially as described.

7. The combination, with the angularly-arranged L-shaped bar A of a harrow-frame, of the shoe D′, having notched side flanges, $r\ r$, substantially as described.

8. The combination, with the angularly-arranged L-shaped bar A of a harrow-frame, of the shoe D′, having notched side flanges, $r\ r$, clip $t$, and bolts $u\ u'$, substantially as described.

9. The combination, with the angularly-arranged L-shaped bar A of a harrow-frame, of the shoe D′, having notched side flanges, $r\ r$, and secured to the bar by a clamp which permits the adjustment of the shoe lengthwise of the bar, substantially as described.

HENRY C. PRATT.

Witnesses:
GEO. B. SELDEN,
JOHN F. SKINNER.